Patented Dec. 23, 1947

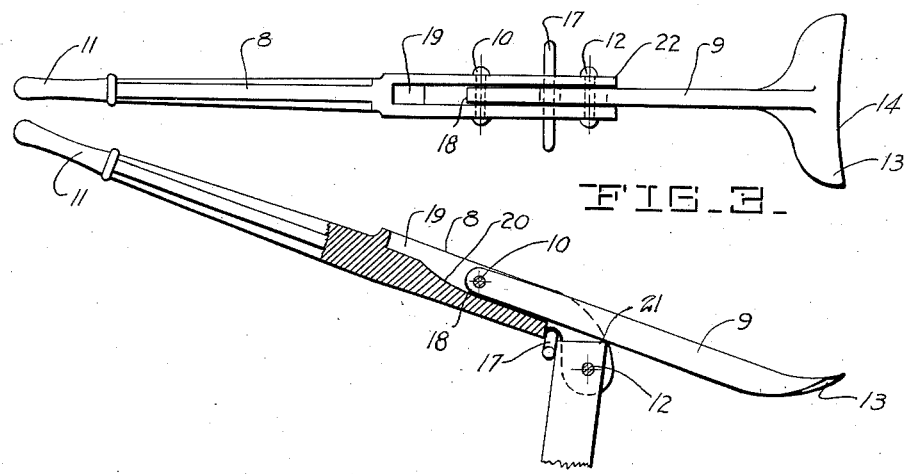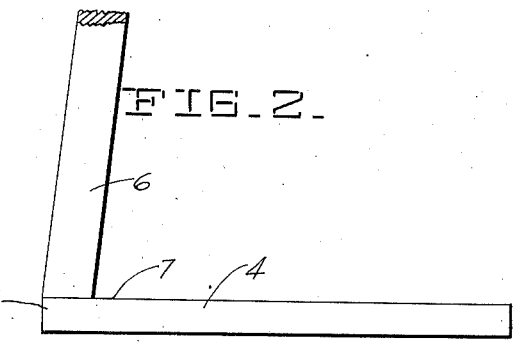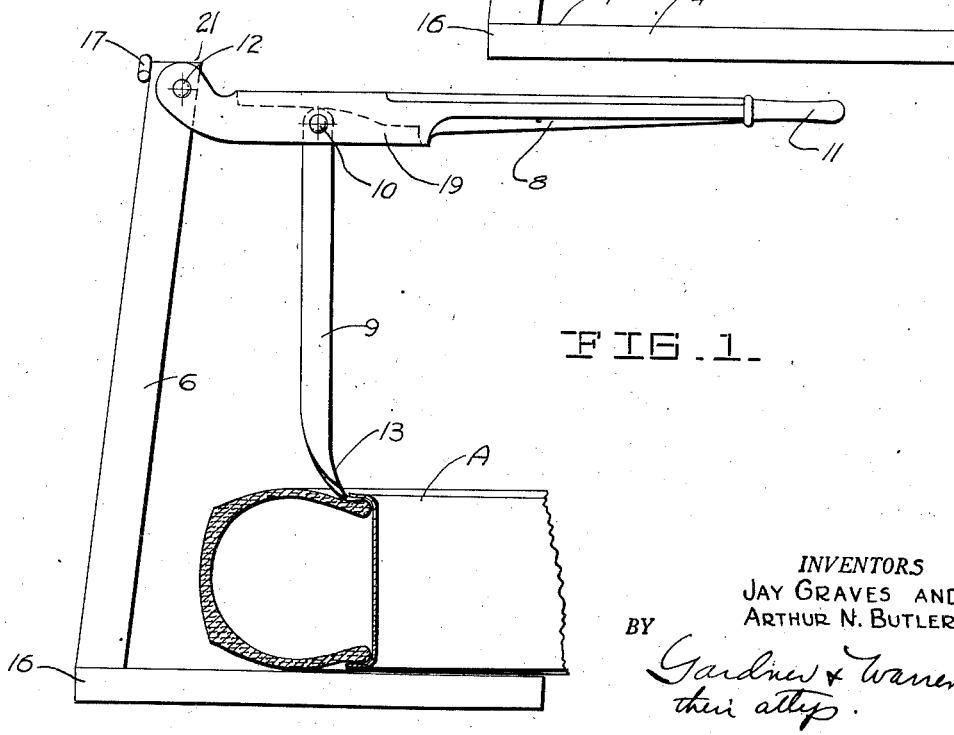

2,433,113

UNITED STATES PATENT OFFICE 2,433,113

LEVER ACTUATED TIRE BEAD FORCING DEVICE

Jay Graves, Berkeley, and Arthur N. Butler, Oakland, Calif., assignors to Speedmaster, Limited, Oakland, Calif., a copartnership composed of said Graves and said Butler Application July 10, 1944, Serial No. 544,212

3 Claims. (Cl. 157—6)

The type of tire tool to which the features of our invention are especially applicable is that in which there is employed a free swinging arm carried by a lever which is so supported that it may be manipulated to force the free end of the arm against the bead of the tire, so as to disengage it from the wheel rim. Usually the operation is arranged to be effected while the tire is laid horizontally, the lever being pivotally supported adjacent the upper end of a suitable standard provided with a base for holding the standard in an upright position.

It is an object of the present invention to improve the form and relationship of the various parts whereby a more effective pressure application may be provided.

Another object of the invention is to design the tool in such manner as to retain the feature of applying the force through the arm in a line perpendicular to the tire affording a better accommodation for tires of various sizes, and providing an increased leverage at substantially no increase in the size of the parts.

A further object of the invention is to provide a tire tool of the type described, in which the parts are designed in such manner that they may be easily and quickly moved to or from a temporary position of rest for greater facility during the tire mounting or dismounting operation, without requiring the operator to manipulate catches or other fastening means.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a side view of the device showing the tool in position in engagement with a tire.

Figure 2 is a view similar to Figure 1 and partly in section, but showing the parts in a position of rest in which the device may be placed.

Figure 3 is a top view of the device as shown in Figure 2.

As shown in the drawings the tool comprises a supporting frame 4, including a standard 6 affixed to a base 7, and on which is fulcrumed a lever 8 carrying a tire engaging arm 9. The lever is pivoted by means of a pin 12 to the standard at the upper end thereof, and is provided at its free end with a handle portion 11 by which the operator may grip the lever in the operation of the device. Attachment of the arm to the lever is effected by means of a pin 10 permitting the arm to hang freely suspended from the lever for movement to and from the standard, it being noted that the axes of the pins are horizontally disposed and preferably parallel.

In the present embodiment the device is designed in such manner that the arm will overlie the base when the arm is engaged with the tire. In this manner the portion of the tire to be engaged by the arm may be supported on the base, and serve to assist in holding the device in a stable position. To provide for effective engagement with the tire the free end of the arm is formed with lateral extensions which define a segment 13, having a curved edge 14, designed for insertion under the rim and engagement with the tire bead. In operating this type of tire tool, the mounted tire A is placed upon the base with the tread adjacent the standard 6, as indicated in Figure 1. Then with the arm segment 13 in engagement with the tire A along the rim, the operator depresses the handle to thereby dislodge the tire bead from contact with the adjacent rim portion. When the bead has been broken away from the rim at one point, the tire and wheel may be rotated or otherwise repositioned on the base so as to progressively present additional tire portions for loosening until the bead is completely freed from the rim. As will be evident the tool may be operated in a somewhat similar manner for mounting the tire on the rim.

As will be clear from the drawings, the standard 6 is positioned to extend from the base at the rear edge 16, and in order that there will be ample space between the standard and segment 13 for accommodating the tire while the arm is in vertical position and at the same time permit a relatively close coupling between the pins 10 and 12, the standard is sloped or otherwise formed to bring its point of connection with the lever a considerable distance horizontally inwardly over the base from the edge 16. In the present embodiment, the pins are so located that when the lever is horizontally extended as in Figure 1, the pin 10 will be disposed approximately over the center of the base while the pin 12 will be disposed at a point approximately midway between vertical lines intersecting the pin 10 when so positioned and the edge 16 of the base. With this arrangement not only is increased leverage afforded the operator in applying the tool, but the entire structure supported by the base will be more effectively balanced thereon, in the various positions assumed by the parts.

It will be evident that when the device is not in use, the parts may be placed in a position of rest with the free ends of both the arm and lever immediately over the base. However, with the parts in this position they will be in the way and interfere with the operation of placing the tire on the base or rotating the tire to the different positions over the base between each bead engaging or separating operation. With the present device the lever may be swung completely over the standard so as to assume as shown in Figure 2, a position at the rear and thus cause the arm to be elevated above the base or otherwise moved to a position which will clear the tire and be out of the way of the operator. A handle 17 by which the entire device may be lifted, is positioned at and affixed to the upper end of the standard at the rear of pin 12 and serves as a convenient stop for the lever in a ready-to-use position, and in order to cause the arm to raise off the base when the lever is moved to said position, the arm is permitted only a limited movement relative to the lever. Thus as shown in Figure 2, the pivoted end portion 18 of the arm is mounted within a channel 19 formed in the lever and is designed to engage either the bottom 20 of the channel or the upper end 21 of the standard and maintained at an angle of about 180° relative to the lever when the latter is moved rearwardly over the standard. As here shown the arm is arranged to engage the upper edge 21 to cause the movement thereof thus set forth. Preferably the stop 17 is located in such position that the lever may assume a nearly horizontal rearward position and thus cause the arm to be elevated high above the base and insure the lever being firmly retained in recumbent position. It is also to be noted in this latter connection, that with the design as above set forth, by far the greater portion of the weight of the arm will be disposed forwardly of the standard, and thus aid, particularly when the device is moved to the recumbent position, in maintaining the device in stable condition.

It is important to note that with the lever and arm arranged to be held in the recumbent position as thus described no catches, friction devices or other fastening means are required to maintain the parts in such position. This is of particular advantage with respect to the initial act of returning the parts to a work engaging position by the operator, since in most instances catches or other devices entail fingering by the operator and any careless manipulation will result as experience has proven, in injuring the operator's fingers. With the release of the parts from recumbent position afforded simply by pulling the lever handle back over the standard, no opportunity will be presented for clamping or otherwise injuring the hands of the operator.

As will be clear from Figure 3, the side walls of the channel 19 are extended to form a pair of ears 22 for the reception of the adjoining end of the standard, and thus not only the arm but the standard is embraced by the lever. This construction as may be evident not only provides for sturdiness in the connection of the parts but enables the body of the arm and standard to be disposed in coplanar relation and held in compact relation with the lever particularly when the device is in the inoperative position with both the lever and arm dropped downward over the base. Preferably the ears 22 are extended in the form of a goose-neck so that the pin 10 may be positioned to lie without the channel 19 and thus permit the arm to fully seat within the channel in coaxial relation with the lever.

We claim:

1. A tire tool comprising a standard having a base extending forwardly therefrom, a lever having an end pivoted to the upper end of the standard for movement thereon from the front to the rear thereof and vice versa, an arm having one end formed with a tire bead engaging part and the other end pivotally connected to said lever near the fulcrum point of the lever with the standard and for movement about an axis parallel to axis of movement of the lever, said arm freely depending from the lever when the latter is extended at the front of the standard and being drawn over the standard by the lever when the latter is moved to the rear of the standard, means engageable by the arm when drawn over the standard to hold said arm in a ready-to-use position, and stop means connected to the standard adjacent the top engageable by the lever when the arm has been drawn over the standard, said arm and lever when engaged with said first and second means respectively, being gravitationally held in such engaged positions.

2. A tire tool in accordance with claim 1 in which the upper end of the standard is extended to lie more forwardly than the portion adjacent the base so that when the arm depends vertically a greater space will be provided between the tire engaging part and standard than between the pivotal point of the lever with the arm and standard.

3. A device as defined in claim 1 wherein said lever has a bifurcated end portion, said end portion being pivotally connected to the top of and straddling said standard, a longitudinally extending channel in said lever one end thereof communicating with the bifurcation in said end portion, said other end of said arm being pivoted between the walls of said channel whereby when the lever is moved to the rear of said standard, the lower edge of said arm will ride over the top of the standard.

JAY GRAVES.
ARTHUR N. BUTLER.

REFERENCES CITED

The following references are of record in the file of this patent:

UNITED STATES PATENTS

| Number | Name | Date |
|---|---|---|
| 1,447,113 | Wodhall | Feb. 27, 1923 |
| 1,567,276 | Kowalczyk et al. | Dec. 29, 1925 |
| 2,241,886 | Pearce et al. | May 13, 1941 |
| 281,378 | Kyser et al. | July 17, 1883 |